United States Patent
Hashimoto et al.

(10) Patent No.: US 7,149,365 B2
(45) Date of Patent: Dec. 12, 2006

(54) IMAGE INFORMATION SUMMARY APPARATUS, IMAGE INFORMATION SUMMARY METHOD AND IMAGE INFORMATION SUMMARY PROCESSING PROGRAM

(75) Inventors: Michikazu Hashimoto, Tsurugashima (JP); Takeshi Nakamura, Tsurugashima (JP); Hajime Miyasato, Tsurugashima (JP); Shinichi Gayama, Tsurugashima (JP); Toshio Tabata, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 861 days.

(21) Appl. No.: 10/238,619

(22) Filed: Sep. 11, 2002

(65) Prior Publication Data

US 2003/0048843 A1 Mar. 13, 2003

(30) Foreign Application Priority Data

Sep. 13, 2001 (JP) .......................... P2001-278504
Sep. 28, 2001 (JP) .......................... P2001-304359

(51) Int. Cl.
G06K 9/20 (2006.01)
G06K 9/46 (2006.01)
G06K 9/00 (2006.01)

(52) U.S. Cl. ..................................... 382/282; 382/190

(58) Field of Classification Search ................ 382/282, 382/232, 107, 190; 386/46, 69, 117; 345/723
See application file for complete search history.

(56) References Cited

U.S. PATENT DOCUMENTS 5,805,733 A * 9/1998 Wang et al. ................. 382/232
5,809,202 A * 9/1998 Gotoh et al. .................. 386/69
5,974,218 A * 10/1999 Nagasaka et al. ............. 386/46
6,078,726 A * 6/2000 Gotoh et al. ................ 386/117
6,549,643 B1 * 4/2003 Toklu et al. ................. 382/107
6,925,455 B1 * 8/2005 Gong et al. .................... 706/45
6,956,904 B1 * 10/2005 Cabasson et al. ...... 375/240.26
7,006,945 B1 * 2/2006 Li ............................... 702/181
2002/0126143 A1 * 9/2002 Bae et al. .................... 345/723
2003/0016945 A1 * 1/2003 Nakamura .................... 386/46

FOREIGN PATENT DOCUMENTS

EP 1 045 316 10/2000

(Continued)

OTHER PUBLICATIONS

"A Quick Scene Classification Method Based on Compact Encoding of Video Feature Sequence", *Articles of Institute of Electronics, Information and Communication Engineers*, A. Nagasaka et al., vol. J81-D-II, No. 8, pp. 1831-1837, Aug. 1998 (w/English language Abstract).

(Continued)

*Primary Examiner*—Amir Alavi
(74) *Attorney, Agent, or Firm*—Drinker Biddle & Reath LLP

(57) ABSTRACT

Provided is an image information summary device for reproducing the summary information, by which an operator is capable of grasping the image information appropriately by the use of the preliminary announcement information. A summary reproducing apparatus obtains the continuous voice image information which is provided in plural times and extracts a characteristic amount of each piece of voice image information. Simultaneously, upon carrying out the summary reproduction, the summary reproducing apparatus compares the object voice image information to be an object of the summary reproduction with the non-object voice image information having the preliminary announcement information in the object voice image information, detects the same shot from the object voice image information and decides the partial image information to be extracted on the basis of the same shot in this object voice image information.

24 Claims, 7 Drawing Sheets

FOREIGN PATENT DOCUMENTS

| | | |
|---|---|---|
| JP | 10-032776 | 2/1998 |
| JP | 10-276435 | 10/1998 |

OTHER PUBLICATIONS

"An Efficient Technique for Summarizing Videos Using Visual Contents", J. Oh et al., Multimedia and Expo, 2000, ICME 2000. 2000 IEEE International Conference on New York, NY, USA, pp. 1167-1170, Jul. 30, 2000.

"An Integrated Scheme for Automated Video Abstraction Based on Unsupervised Cluster-Validity Analysis", A. Hanjalic et al., *IEEE Transactions on Circuits and Systems for Video Technology*, vol. 9, No. 8, pp. 1280-1289, Dec. 1999.

"Multimedia Content Analysis Using Both Audio and Visual Clues", Y. Wang et al., *IEEE Signal Processing Magazine*, pp. 12-36, Nov. 2000.

* cited by examiner

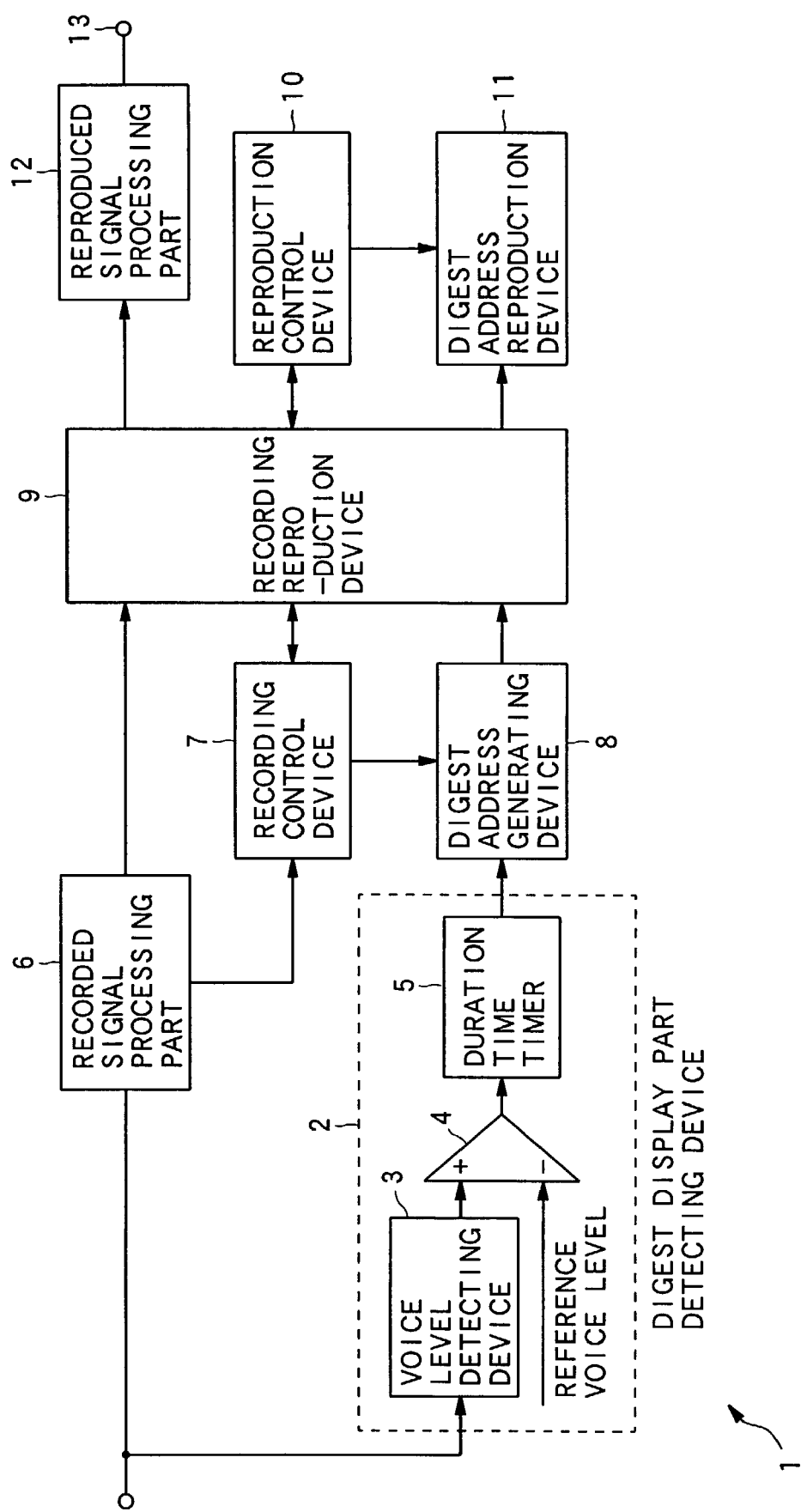

IMAGE INFORMATION SUMMARY APPARATUS, IMAGE INFORMATION SUMMARY METHOD AND IMAGE INFORMATION SUMMARY PROCESSING PROGRAM

BACKGROUND OF THE INVENTION

1. Field of the Invention

The present invention relates to a technical field of a summary reproducing apparatus of the image information and particularly, the present invention relates to a technical field by which the partial image information to be extracted upon reproduction of the summary is decided on the basis of the preliminary announcement information.

2. Description of the Related Art

In recent years, as a recording apparatus such as a VTR (Video Tape Recorder) for recording and reproducing the image information such as TV broadcasting programs or the like has become widely used, the digest reproduction (i.e., the summary reproduction) has been come into practical use to provide the image information by which the image information is summarized in a short time (hereinafter, referred to as the summary information) without seeing all of the recorded image information.

In order to carry out suchlike summary reproduction, for example, mainly taking particular note of the image information itself, there is a method to carry out the summary reproduction by detecting a portion in which a scene is changed over (i.e., scene change). And taking particular note of the voice information to be attached to the image information, there is a method to carry out the summary reproduction by the use of the amplitude of the voice information and a duration time thereof. A typical method to carry out the summary reproduction as taking particular note of the voice information is described in Japanese Patent Application Laid-open No. 10-32776.

As shown in FIG. 7, a summary reproducing apparatus 1 described in the above publication is provided with a voice level detecting device 3 for detecting a voice level of the image information to which the voice information, which is provided through a communication line or an electric wave or the like, is attached, a comparator 4 for comparing this voice level with a reference voice level, a duration time timer 5, which obtains the duration time when the voice level is larger than the reference voice level, a digest address generating device 8 which generates an address of a digest portion from the duration time which is obtained by the duration time timer 5, a recording reproduction device 9 which records this address, a digest address reproducing device 11 which reproduces the recorded address, and a reproduction control device 10 which reproduces the voice image information of the digest portion on the basis of this address.

According to this constitution, this summary reproducing apparatus 1 carries out the summary reproduction of the voice image information, in such a manner that it records the address of the portion where the voice level of the input image information is larger than the reference voice level in the case where the voice level of the input image information is larger than the reference voice level, and where the input image information has been continued for a predetermined time and then it extracts a portion of which level is larger than this reference voice level on the basis of this address.

However, the above-described method to carry out the summary reproduction as taking particular note of the voice information to be attached to the image information involves a problem such that it cannot reproduce the summary appropriately if a content of this image information is not appreciated in the image information having a story (continuity) such as a drama or the like.

Normally, in a sports program, the voice portion having a large voice level indicates a portion having the exciting and enjoyable image information and further, it constitutes a characteristic portion of the image information. Alternatively, in a news program, a silent portion (i.e., a portion without voice) indicates a portion in which a scene is changed over or a content is changed over and further, it constitutes a characteristic portion of the image information.

However, in the image information by which various scenes are built on the basis of a scenario of a drama or the like so as to attain the artistic intention and which has the continuity for making a story, the portion having the large voice level or the silent portion having no voice is not necessarily a characteristic portion of this image information.

Accordingly, according to the above-described summary reproduction method, in the image information such as a drama, it is often the case that the extracted portion is not important for the image information, so that this involves a problem such that it the appropriate summary reproduction cannot be carried out appropriately.

SUMMARY OF THE INVENTION

The present invention has been made taking the foregoing problems into consideration, an object of the present invention is to provide the summary information by which an operator is capable of grasping the image information more appropriately in the image information having continuity such as a drama or the like.

The above object of the present invention can be achieved by an image information summary apparatus for extracting one piece or plural pieces of partial image information which is a portion of the input image information from the input image information and generating the summary information in which a time length of the image information is contracted on the basis of the extracted partial image information, provided with: an obtaining device which obtains the preliminary announcement information which has been generated in advance and in which characteristic portions in the input image information are continuously connected; a detecting device which detects the same partial information which is the same image information as the characteristic portion which constitutes the preliminary announcement information from the input image information; a decision device which decides the partial image information to be extracted on the basis of the detected same partial information; and a generating device which generates the summary information by extracting the decided partial image information from the input image information.

According to this constitution, in the invention according to a first aspect, the obtaining device obtains the preliminary announcement information in the input image information, the detecting device detects the same partial information which is the same as the characteristic portion which constitutes the preliminary announcement information from the input image information, the decision device decides the partial image information on the basis of this same partial information, and the generating device generates the summary information on the basis of this partial image information.

Normally, in the image information by which various scenes are built on the basis of a scenario of a drama or the like so as to attain the artistic intention and which has the continuity for making a story, the portion having the large voice level or the silent portion having no voice is not necessarily a characteristic portion of this image information.

Accordingly, a producer of the image information, namely, a human being is capable of generating the summary information on the basis of the preliminary announcement information which is edited depending on the appreciation of a content of the image information, so that it is possible to provide the summary information which is more suitable for the user to grasp a content of the image information appropriately in a short period of time.

The above object of the present invention can be achieved by an image information summary apparatus for extracting one piece or plural pieces of partial image information which is a portion of the input image information from the input image information and generating the summary information in which a time length of the image information is contracted on the basis of the extracted partial image information, provided with: an obtaining device which obtains other image information at least having the preliminary announcement information which has been generated in advance and in which characteristic portions in the input image information are continuously connected; a detecting device which detects the same partial information which is partially the same image information as the characteristic portion which constitutes the preliminary announcement information from the input image information by comparing the input image information with the other image information; a decision device which decides the partial image information to be extracted on the basis of the detected same partial information; and a generating device which generates the summary information as extracting the decided partial image information from the input image information.

According to this constitution, in the invention according to a second aspect, the obtaining device obtains the image information at least having the preliminary announcement information in the input image information, the detecting device compares the input image information with other image information and detects the same partial information from this input image information, the decision device decides the partial image information on the basis of this same partial information, and the generating device generates the summary information on the basis of this partial image information.

Normally, in the image information by which various scenes are built on the basis of a scenario of a drama or the like so as to attain the artistic intention and which has the continuity for making a story, it is often the case that a content thereof is completed when the image information is provided plural times and further, it is often the case that the preliminary announcement image of a next time is included in the image information each time to be provided.

Accordingly, it is possible to detect the same partial information in each piece of image information by comparing the information to be summarized (for example, any image information among the image information of plural times) with other image information (for example, the image information of last time among the image information to be summarized). Therefore, without designating the preliminary announcement information such as a temporal position or the like, it is possible to generate the summary information on the basis of this preliminary announcement information by obtaining the image information having this preliminary announcement information. As a result, it is possible to provide the summary information that is more suitable for the user to grasp a content of the image information appropriately without the need of burdensome operations.

In one aspect of the image information summary apparatus of the present invention, the detecting device detects the same partial information having a predetermined time length.

According to this constitution, in the invention according to a third aspect, the detecting device detects the same partial information having a predetermined time.

Normally, the image information to be provided as the preliminary announcement information comprises the image information in which the short image information in the characteristic portion of the image information to be summarized are continuously connected in a predetermined time. The preliminary announcement information does not contain the partial image information which is too short. The partial image information has a maximum of a time length of some seconds (for example, about five seconds) in one scene.

Accordingly, it is possible to determine that the partial image information having too short time length and the partial image information of not less than some seconds are not detected on the basis of the preliminary announcement information, so that it is possible to appropriately detect the same partial information which is the same as the preliminary announcement image information by detecting the same partial information having a predetermined time length.

In another aspect of the image information summary apparatus of the present invention, when a temporal position in the input image information of the same partial information which is detected by the detecting device is identical with a temporal position in other image information having the preliminary announcement information within a predetermined temporal range, the detecting device excludes the same partial information, of which temporal position is identical with that in other image information within the temporal range, from the same partial information, which is detected by the detecting device; and the decision device decides the partial image information to be extracted on the basis of a detection result, from which the same partial information, of which temporal position is identical with that in other image information within the predetermined temporal range, is excluded.

According to this constitution, in the invention according to a fourth aspect, when the temporal position of the detected same partial information in the input image information is identical with the temporal position of the equivalent detected same partial information in other image information within a predetermined range, the detecting device excludes this detected same partial information from a detection result and the decision device decides the partial image information on the basis of this detection result.

Normally, when the image information by which various scenes are built on the basis of a scenario of a drama or the like so as to attain the artistic intention and which has the continuity for making a story is provided by plural pieces of image information, each piece of the image information has the same portion such as an opening or an ending or the like. These portions are the same as the image information, however, they do not compose a characteristic portion of this image information.

Accordingly, by excluding the same partial information, of which temporal positions are identical with each other within a predetermined range, from the detection result, when the same partial information which is not the characteristic portion of the present image information is eliminated, it is possible to appropriately detect the same partial information which is the same as the preliminary announcement image information, so that it is further possible to decide the partial image information on the basis of this same partial information.

In further aspect of the image information summary apparatus of the present invention, when a temporal position in the input image information of the same partial information which is detected by the detecting device and a temporal position in the input image information of other pieces of the same partial information are temporally continued, the detecting device excludes the temporally continued same partial information from the same partial information, which is detected by the detecting device; and the decision device decides the partial image information to be extracted on the basis of a detection result, from which the temporally contacting same partial information is excluded.

According to this constitution, in the invention according to a fifth aspect, when the temporal position of the same partial information in this input image information temporally comes into contact with the temporal position of other same partial information, the detecting device excludes the same partial information which temporally comes into contact with other same partial information from a detection result and the decision device decides the partial image information on the basis of this detection result.

Normally, the preliminary announcement information connects the characteristic portion in image information continuously so as to summarize the characteristic portion in a short time, so that each piece of partial image information in the preliminary announcement information does not come into contact with other partial image information temporally.

Accordingly, by excluding the same partial information which temporally comes into contact with other same partial information from a detection result, it is possible to decide the partial image information to be extracted on the basis of the detection result from which this same partial information is excluded, so that it is possible to appropriately detect the same partial information which is the same as the preliminary announcement image information.

In further aspect of the image information summary apparatus of the present invention, the image information summary apparatus is further provided with: an identification information obtaining device which obtains the identification information of the image information, and in the case where it is identified by the identification information obtaining device that the identification information of the image information is the image information having a story, the decision device decides the partial image information to be extracted on the basis of the same partial information which is detected by the detecting device.

According to this constitution, in the invention according to a sixth aspect, in the case where the identification information of this image information is identified as the image information having a story as the identification information obtaining device is provided to obtain the identification information of the image information, the decision device decides the partial image information on the basis of this detected same partial information.

In the image information having a story such as a drama or the like, the portion having the large voice level or the silent portion having no voice is not necessarily a characteristic portion of this image information while in the image information such as a sports program and a news program, it is often the case that there is no preliminary announcement information. Therefore, in general, it is possible to detect the characteristic portion of this image information on the basis of the voice information that is attached to this image information.

Accordingly, in the case where the image information is identified as that with a story such as a drama or the like, a producer of the image information, namely, a human being is capable of generating the summary information on the basis of the preliminary announcement information which is edited depending on the appreciation of a content of the image information, so that it is possible to provide the summary information which is more suitable for the user to grasp a content of the image information appropriately in a short period of time.

The above object of the present invention can be achieved by an image information summary method for extracting one piece or plural pieces of partial image information which is a portion of the input image information from the input image information and generating the summary information in which a time length of the image information is contracted on the basis of the extracted partial image information, provided with the processes of: obtaining processing for obtaining the preliminary announcement information which has been generated in advance and in which characteristic portions in the input image information are continuously connected; detecting processing for detecting the same partial information which is the same image information as the characteristic portion which constitutes the preliminary announcement information from the input image information; decision processing for deciding the partial image information to be extracted on the basis of the detected same partial information; and generating processing for generating the summary information by extracting the decided partial image information from the input image information.

According to this constitution, in the invention according to a seventh aspect, the preliminary announcement information in the input image information is obtained according to an obtaining processing process and the same partial information which is the same as the characteristic portion composing the preliminary announcement information is detected from the input image information according to the detection processing process. Simultaneously, the partial image information is decided on the basis of this same partial information according to the decision processing process and the summary information is generated on the basis of this partial image information according to the generation processing process.

Normally, in the image information by which various scenes are built on the basis of a scenario of a drama or the like so as to attain the artistic intention and which has the continuity for making a story, the portion having the large voice level or the silent portion having no voice is not necessarily a characteristic portion of this image information.

Accordingly, a producer of the image information, namely, a human being is capable of generating the summary information on the basis of the preliminary announcement information which is edited depending on the appreciation of a content of the image information, so that it is possible to provide the summary information which is more suitable for the user to grasp a content of the image information appropriately in a short period of time.

The above object of the present invention can be achieved by an image information summary method for extracting one piece or plural pieces of partial image information which is a portion of the input image information from the input image information and generating the summary information in which a time length of the image information is contracted on the basis of the extracted partial image information, provided with the processes of: obtaining processing for obtaining other image information at least having the preliminary announcement information which has been generated in advance and in which characteristic portions in the input image information are continuously connected; detecting processing for detecting the same partial information which is partially the same image information as the characteristic portion which constitutes the preliminary announcement information from the input image information by comparing the input image information with the other image information; decision processing for deciding the partial image information to be extracted on the basis of the detected same partial information; and generating processing for generating the summary information as extracting the decided partial image information from the input image information.

According to this constitution, in the invention according to an eighth aspect, the image information at least having the preliminary announcement information in the input image information is obtained according to an obtaining processing process, the input image information is compared with other image information and further the foregoing same partial information is detected from this input image information, according to the detection processing process. Simultaneously, the partial image information to be extracted is decided on the basis of this same partial information according to the decision processing process and the summary information is generated according to the generation processing process.

Normally, in the image information by which various scenes are built on the basis of a scenario of a drama or the like so as to attain the artistic intention and which has the continuity for making a story, it is often the case that a content thereof is completed when the image information is provided plural times and further, it is often the case that the preliminary announcement image of a next time is included in the image information each time to be provided.

Accordingly, it is possible to detect the same partial information in each piece of image information by comparing the information to be summarized (for example, any image information among the image information of plural times) with other image information (for example, the image information of last time among the image information to be summarized). Therefore, without designating the preliminary announcement information such as a temporal position or the like, it is possible to generate the summary information on the basis of this preliminary announcement information by obtaining the image information having this preliminary announcement information. As a result, it is possible to provide the summary information that is more suitable for the user to grasp a content of the image information appropriately without the need of burdensome operations.

In one aspect of the image information summary method of the present invention, according to the detection processing process, the same partial information having a predetermined time length is detected.

According to this constitution, in the invention according to a ninth aspect, the same partial information having a predetermined time length is detected according to the detection processing process.

Normally, the image information to be provided as the preliminary announcement information comprises the image information in which the short image information in the characteristic portion of the image information to be summarized are continuously connected in a predetermined time. The preliminary announcement information does not contain the partial image information which is too short. The partial image information has a maximum of a time length of some seconds (for example, about five seconds) in one scene.

Accordingly, it is possible to determine that the partial image information having too short time length and the partial image information of not less than some seconds are not detected on the basis of the preliminary announcement information, so that it is possible to appropriately detect the same partial information which is the same as the preliminary announcement image information by detecting the same partial information having a predetermined time length.

In another aspect of the image information summary method of the present invention, when a temporal position in the input image information of the same partial information which is detected according to the detection processing process is identical with a temporal position in other image information having the preliminary announcement information within a predetermined temporal range, according to the detection processing process, the same partial information, of which temporal position is identical with that in other image information within the temporal range, is excluded from the same partial information, which is detected according to the detection processing process; and according to the decision processing process, the partial image information to be extracted is decided on the basis of a detection result, from which the same partial information of which temporal position is identical with that in other image information within the predetermined temporal range is excluded.

According to this constitution, in the invention according to a tenth aspect, when the temporal position of the detected same partial information in the input image information is identical with the temporal position of the equivalent detected same partial information in other image information within a predetermined range, this detected same partial information is excluded from the detection result according to the detection processing process and the partial image information is decided on the basis of this detection result according to the decision processing process.

Normally, when the image information by which various scenes are built on the basis of a scenario of a drama or the like so as to attain the artistic intention and which has the continuity for making a story is provided by plural pieces of image information, each piece of the image information has the same portion such as an opening or an ending or the like. These portions are the same as the image information, however, they do not compose a characteristic portion of this image information.

Accordingly, by excluding the same partial information, of which temporal positions are identical with each other within a predetermined range, from the detection result, when the same partial information which is not the characteristic portion of the present image information is eliminated, it is possible to appropriately detect the same partial information which is the same as the preliminary announcement image information, so that it is further possible to decide the partial image information on the basis of this same partial information.

In further aspect of the image information summary method of the present invention, when a temporal position in the input image information of the same partial information which is detected according to the detection processing process and a temporal position in the input image information of other pieces of the same partial information are temporally continued, according to the detection processing process, the temporally continued same partial information is excluded from the same partial information, which is detected by the detection processing process; and according to the decision processing process, the partial image information to be extracted is decided on the basis of a detection result, from which the temporally contacting same partial information is excluded.

According to this constitution, in the invention according to an eleventh aspect, when the temporal position of the same partial information in this input image information temporally comes into contact with the temporal position of other same partial information, the same partial information which temporally comes into contact with other same partial information is excluded from a detection result according to the detection processing process and the partial image information is decided on the basis of this detection result according to the decision processing process.

Normally, the preliminary announcement information connects the characteristic portion in image information continuously so as to summarize the characteristic portion in a short time, so that each piece of partial image information in the preliminary announcement information does not come into contact with other partial image information temporally.

Accordingly, by excluding the same partial information which temporally comes into contact with other same partial information from a detection result, it is possible to decide the partial image information to be extracted on the basis of the detection result from which this same partial information is excluded, so that it is possible to appropriately detect the same partial information which is the same as the preliminary announcement image information.

In further aspect of the image information summary method of the present invention, the image information summary method further includes identification information obtaining processing process for obtaining the identification information of the image information, and in the case where it is identified that the identification information of the image information is the image information having a story according to the identification information obtaining processing process, according to the decision processing process, the partial image information to be extracted is decided on the basis of the same partial information which is detected by the detection processing process.

According to this constitution, in the invention according to a twelfth aspect, in the case where the identification information of this image information is identified as the image information having a story as the identification information obtaining processing process is included to obtain the identification information of the image information, the partial image information is decided on the basis of this detected same partial information according to the decision processing process.

In the image information having a story such as a drama or the like, the portion having the large voice level or the silent portion having no voice is not necessarily a characteristic portion of this image information while in the image information such as a sports program and a news program, it is often the case that there is no preliminary announcement information. Therefore, in general, it is possible to detect the characteristic portion of this image information on the basis of the voice information that is attached to this image information.

Accordingly, in the case where the image information is identified as that with a story such as a drama or the like, a producer of the image information, namely, a human being is capable of generating the summary information on the basis of the preliminary announcement information which is edited depending on the appreciation of a content of the image information, so that it is possible to provide the summary information which is more suitable for the user to grasp a content of the image information appropriately in a short period of time.

The above object of the present invention can be achieved by an image information summary program for, by a computer, extracting one piece or plural pieces of partial image information which is a portion of the input image information from the input image information and generating the summary information in which a time length of the image information is contracted on the basis of the extracted partial image information, said image information summary program making the computer function as: an obtaining device which obtains the preliminary announcement information which has been generated in advance and in which characteristic portions in the input image information are continuously connected; a detecting device which detects the same partial information which is the same image information as the characteristic portion which constitutes the preliminary announcement information from the input image information; a decision device which decides the partial image information to be extracted on the basis of the detected same partial information; and a generating device which generates the summary information as extracting the decided partial image information from the input image information.

According to this constitution, in the invention according to a thirteenth aspect, the preliminary announcement information in the input image information is obtained by a computer and the same partial information which is the same as the characteristic portion composing the preliminary announcement information is detected from the input image information. Simultaneously, the partial image information is decided on the basis of this same partial information and the summary information is generated on the basis of this partial image information.

Normally, in the image information by which various scenes are built on the basis of a scenario of a drama or the like so as to attain the artistic intention and which has the continuity for making a story, the portion having the large voice level or the silent portion having no voice is not necessarily a characteristic portion of this image information.

Accordingly, a producer of the image information, namely, a human being is capable of generating the summary information on the basis of the preliminary announcement information which is edited depending on the appreciation of a content of the image information, so that it is possible to provide the summary information which is more suitable for the user to grasp a content of the image information appropriately in a short period of time.

The above object of the present invention can be achieved by an image information summary program for, by a computer, extracting one piece or plural pieces of partial image information which is a portion of the input image information from the input image information and generating the summary information in which a time length of the image information is contracted on the basis of the extracted partial image information, said image information summary program making the computer function as: an obtaining device which obtains other image information at least having the preliminary announcement information which has been generated in advance and in which characteristic portions in the input image information are continuously connected; a detecting device which detects the same partial information which is partially the same image information as the characteristic portion which constitutes the preliminary announcement information from the input image information as comparing the input image information with the other image information; a decision device which decides the partial image information to be extracted on the basis of the detected same partial information; and a generating device which generates the summary information as extracting the decided partial image information from the input image information.

According to this constitution, in the invention according to a fourteenth aspect, the image information having at least the preliminary announcement information in the input image information is obtained by a computer, the input image information is compared with other image information and the foregoing same partial information is detected from this input image information. Simultaneously, the partial image information is decided on the basis of this same partial information and the summary information is generated.

Normally, in the image information by which various scenes are built on the basis of a scenario of a drama or the like so as to attain the artistic intention and which has the continuity for making a story, it is often the case that a content thereof is completed when the image information is provided plural times and further, it is often the case that the preliminary announcement image of a next time is included in the image information each time to be provided.

Accordingly, it is possible to detect the same partial information in each piece of image information by comparing the information to be summarized (for example, any image information among the image information of plural times) with other image information (for example, the image information of last time among the image information to be summarized). Therefore, without designating the preliminary announcement information such as a temporal position or the like, it is possible to generate the summary information on the basis of this preliminary announcement information by obtaining the image information having this preliminary announcement information. As a result, it is possible to provide the summary information that is more suitable for the user to grasp a content of the image information appropriately without the need of burdensome operations.

In one aspect of the image information summary program of the present invention, the image information summary program makes the computer function as a detecting device which detects the same partial information having a predetermined time length.

According to this constitution, in the invention according to a fifteenth aspect, the same partial information having a predetermined time length is detected by a computer.

Normally, the image information to be provided as the preliminary announcement information comprises the image information in which the short image information in the characteristic portion of the image information to be summarized are continuously connected in a predetermined time. The preliminary announcement information does not contain the partial image information which is too short. The partial image information has a maximum of a time length of some seconds (for example, about five seconds) in one scene.

Accordingly, it is possible to determine that the partial image information having too short time length and the partial image information of not less than some seconds are not detected on the basis of the preliminary announcement information, so that it is possible to appropriately detect the same partial information which is the same as the preliminary announcement image information by detecting the same partial information having a predetermined time length.

In another aspect of the image information summary program of the present invention, when a temporal position in the input image information of the detected same partial information is identical with a temporal position in other image information having the preliminary announcement information within a predetermined temporal range, the image information summary program makes the computer function as: a detecting device which excludes the same partial information, of which temporal position is identical with that in other image information within the temporal range, from the detected same partial information; and a decision device which decides the partial image information to be extracted on the basis of a detection result, from which the same partial information, of which temporal position is identical with that in other image information within the predetermined temporal range, is excluded.

According to this constitution, in the invention according to a sixteenth aspect, when the temporal position of the detected same partial information in the input image information is identical with the temporal position of the equivalent detected same partial information in other image information within a predetermined range, this detected same partial information is excluded from the detection result by a computer and the partial image information is decided on the basis of this detection result.

Normally, when the image information by which various scenes are built on the basis of a scenario of a drama or the like so as to attain the artistic intention and which has the continuity for making a story is provided by plural pieces of image information, each piece of the image information has the same portion such as an opening or an ending or the like. These portions are the same as the image information, however, they do not compose a characteristic portion of this image information.

Accordingly, by excluding the same partial information, of which temporal positions are identical with each other within a predetermined range, from the detection result, when the same partial information which is not the characteristic portion of the present image information is eliminated, it is possible to appropriately detect the same partial information which is the same as the preliminary announcement image information, so that it is further possible to decide the partial image information on the basis of this same partial information.

In further aspect of the image information summary program of the present invention, when a temporal position in the input image information of the detected same partial and a temporal position in the input image information of other pieces of the same partial information are temporally continued, the image information summary program makes the computer function as: a detecting device which excludes the temporally continued same partial information from the detected same partial information; and a decision device which decides the partial image information to be extracted on the basis of a detection result, from which the temporally contacting same partial information is excluded.

According to this constitution, in the invention according to a seventeenth aspect, when the temporal position of the same partial information in this input image information temporally comes into contact with the temporal position of other same partial information, the same partial information which temporally comes into contact with other same partial information is excluded from a detection result by a computer and the partial image information is decided on the basis of this detection result.

Normally, the preliminary announcement information connects the characteristic portion in image information continuously so as to summarize the characteristic portion in a short time, so that each piece of partial image information in the preliminary announcement information does not come into contact with other partial image information temporally.

Accordingly, by excluding the same partial information which temporally comes into contact with other same partial information from a detection result, it is possible to decide the partial image information to be extracted on the basis of the detection result from which this same partial information is excluded, so that it is possible to appropriately detect the same partial information which is the same as the preliminary announcement image information.

In further aspect of the image information summary program of the present invention, the image information summary program makes the computer function as: an identification information obtaining device which obtains the identification information of the image information, wherein, in the case where it is identified that the identification information of the image information is the image information having a story, the image information summary program makes the computer function as a decision device which decides the partial image information to be extracted on the basis of the detected same partial information.

According to this constitution, in the invention according to an eighteenth aspect, in the case where the identification information of this image information is identified as the image information having a story as the identification information of the image information is obtained by a computer, the partial image information is decided on the basis of this detected same partial information.

In the image information having a story such as a drama or the like, the portion having the large voice level or the silent portion having no voice is not necessarily a characteristic portion of this image information while in the image information such as a sports program and a news program, it is often the case that there is no preliminary announcement information. Therefore, in general, it is possible to detect the characteristic portion of this image information on the basis of the voice information that is attached to this image information.

Accordingly, in the case where the image information is identified as that with a story such as a drama or the like, a producer of the image information, namely, a human being is capable of generating the summary information on the basis of the preliminary announcement information which is edited depending on the appreciation of a content of the image information, so that it is possible to provide the summary information which is more suitable for the user to grasp a content of the image information appropriately in a short period of time.

BRIEF DESCRIPTION OF THE DRAWINGS

FIG. 7 is a block diagram for showing a constitution of a conventional summary reproducing apparatus.

DETAILED DESCRIPTION OF THE INVENTION

A preferred embodiment according to the present invention will be described on the basis of the drawings below.

According to the present embodiment, the present invention is applied to a summary reproducing apparatus for summarizing and reproducing the voice image information such as TV programs or the like, which are provided through a communication line or an electric wave or the like.

In the first place, by using FIG. 1 and FIG. 2, an entire constitution and a schematic operation of the summary reproducing apparatus according to the present embodiment will be explained below.

Figure 1:
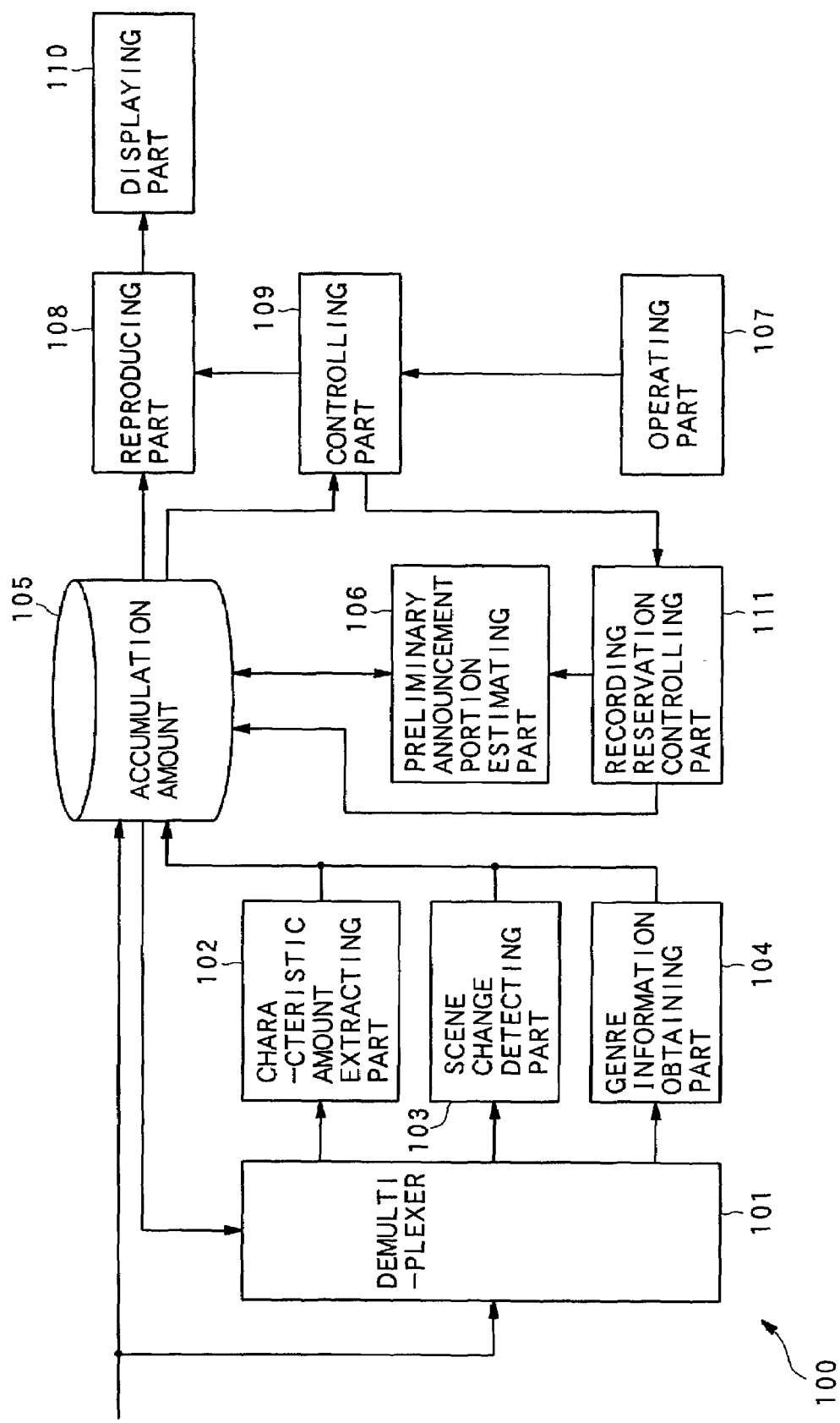
FIG. 1 is a block diagram for illustrating a schematic constitution of a summary reproducing apparatus according to the present invention.
Figure 2:
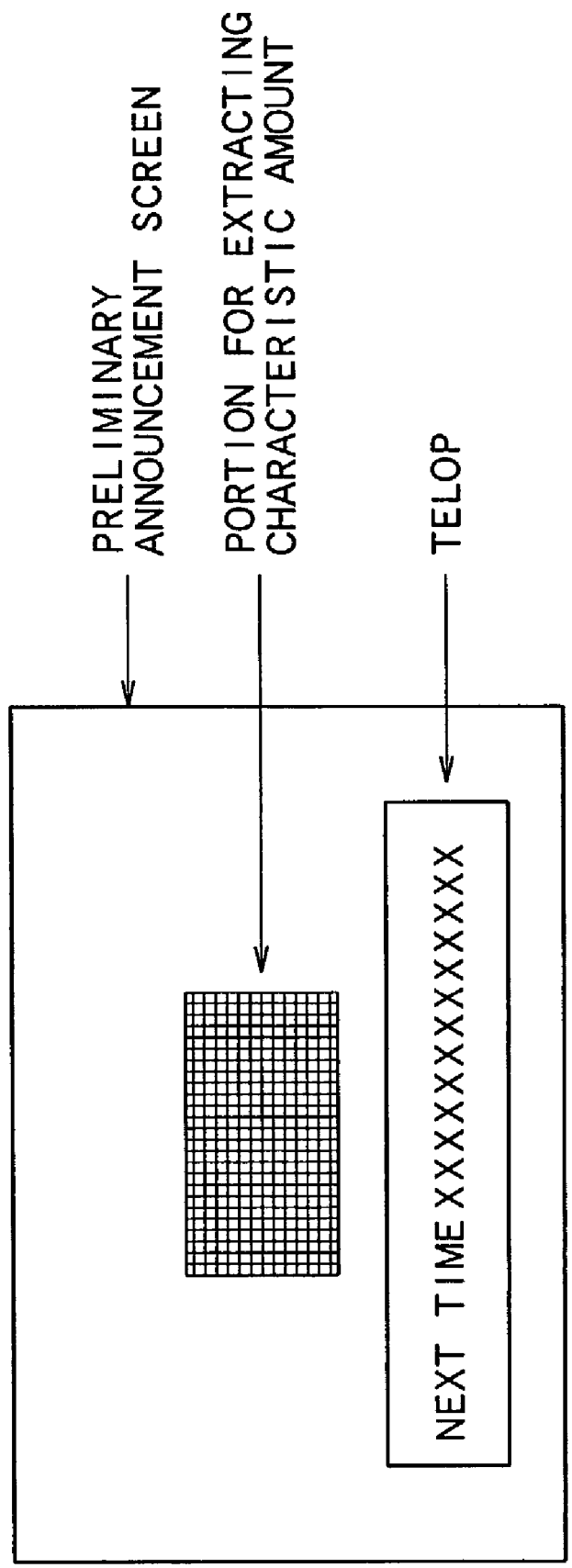
FIG. 2 is a view for explaining an extraction principle of a characteristic amount of the image information in a frame.

In this case, FIG. 1 is a block diagram for illustrating a schematic constitution of a summary reproducing apparatus according to the present embodiment and FIG. 2 is a view for explaining an extraction principle of a characteristic amount of the image information in a frame.

A summary reproducing apparatus 100 according to the present embodiment shown in FIG. 1 inputs the digital voice image information which is transmitted from communication lines or is received by a receiving part (not illustrated) (hereinafter, merely referred to as the voice image information). Further, the summary reproducing apparatus 100 decodes each piece of voice image information, namely, this input digital signal, extracts a characteristic amount of the image information for each scene from the decoded each piece of voice image information and decides the partial image information to be extracted upon reproducing the summary (hereinafter, referred to as a summary segment) by the use of the preliminary announcement information in this digital voice image information.

This preliminary announcement information comprises the image information in which the short image portions (hereinafter, referred to as a shot (partial information)) in plural characteristic scenes of the input digital voice image information are continuously connected. This preliminary announcement information is edited by a human being, namely, a producer of the image information depending on the appreciation of a content of the voice image information, and this voice image information is briefly summarized thereby.

Normally, the image information having continuity such as a drama, namely, the image information by which various scenes are built on the basis of a scenario so as to attain the artistic intention and which is made as a story is characterized in that a content of the voice image information is completed when the image information is provided plural times and further, each piece of voice image information is almost never provided at once so that time deviation occurs upon providing each piece of voice image information and the preliminary announcement image of a next time is included in the voice image information of each time to be provided.

Considering the above-described characteristics, according to the present embodiment, continuous voice image information of plural times is accumulated by the recording or the like, respectively so as to extract the characteristic amount of each piece of voice image information. In the case of carrying out the summary reproduction, the voice image information which is an object of the summary reproduction (for example, the Nth times (hereinafter, referred to as the object voice image information)) is compared with the voice image information having the preliminary announcement information in the object voice image information (for example, the N-1th times (hereinafter, referred to as the non-object voice image information)) and detects the same shot from the object voice image information, so that the summary segment to be extracted is decided on the basis of this same shot.

As shown in FIG. 1, the summary reproducing apparatus 100 according to the present embodiment is provided with a demultiplexer 101 for separating the image information and the information (hereinafter, referred to as the attached information) having the identification information (hereinafter, referred to as the genre information) in this image information from the obtained voice image information, a characteristic amount extracting part 102 for extracting the characteristic amount of each piece of voice image information, a scene change detecting part 103 for detecting the scene change of each scene from the obtained voice image information, a genre information obtaining part 104 for obtaining the genre information from the attached information, an accumulation part 105 for accumulating the voice image information of each time and the characteristic amount and the genre information which are obtained in each piece of voice image information, a preliminary announcement portion estimating part 106 for detecting the same shot as the preliminary announcement information in this voice image information from the voice image information, an operating part 107 for operating each part and inputting a time length for summarizing the voice image information, a reproducing part 108 for summarizing and reproducing the accumulated voice image information, a controlling part 109 for deciding the summary segment in the voice image information which is accumulated on the basis of the same shot and controlling the reproducing part 108, a displaying part 110 for displaying and outputting the summarized and reproduced image signal together with a voice signal, and a recording reservation controlling part 111 for making a reservation of the continuous voice image information of plural times.

Alternatively, the preliminary announcement portion estimating part 106 constitutes the detecting device according to the present invention and further, constitutes the obtaining device according to the present invention together with the accumulation part 105. Additionally, the controlling part 109 constitutes the generating device according to the present invention together with the reproducing part 108 and further, the controlling part 109 constitutes the decision device and the generating device according to the present invention.

In the demultiplexer 101, the voice image information which is transmitted from communication lines or is received by a receiving part (not illustrated) or the voice image information which have been already accumulated in the accumulation part 105 is inputted. The demultiplexer 101 separates the image information and the attached information from this input digital voice image information, so that it outputs the image information to the characteristic amount extracting part 102 and the scene change detecting part 103 and outputs the attached information to the genre information obtaining part 104.

This attached information partially has the genre information, for example, a news program, a sports program, a movie, a drama, a music program and a variety show program or the like. In BS (Broadcasting Satellite) digital broadcasting, the program arrangement information (Service Information) corresponds to this attached information. In this case, the demultiplexer 101 outputs the service information to the genre information obtaining part 104.

In the characteristic amount extracting part 102, the image information that is outputted from the demultiplexer 101 is inputted. This characteristic amount extracting part 102 extracts the characteristic amount in all frames of the input image information and outputs this extracted characteristic amount to the accumulation part 105.

For example, according to the present embodiment, the color average is calculated for each frame and this color average value is extracted as the characteristic amount. Particularly, according to the present embodiment, the high speed processing is carried out, so that, as shown in FIG. 2, the color average of a portion at a center of a screen is calculated for each frame.

This theory of extracting the characteristic amount of the present image information by calculating the color average for each frame is described, for example, in "a high speed classifying method of an image scene on the basis of a compression coding of a time series frame characteristic", Articles of Institute of Electronics, Information and Communication Engineers, D-II Vol. J81-D-II No. 8 pp. 1831 to 1837, issued on August in 1998. According to a method to extract the characteristic amount of the image information which is described in this article, the color average for each frame is obtained with respect to each component of each RGB color system, so that these three components are combined to be the characteristic amount of each frame.

In the scene change detecting part 103, the image information that has been outputted from the demultiplexer 101 is inputted. The scene change detecting part 103 detects the scene change in this input image information and outputs the temporal position information, in which the scene change is carried out (hereinafter, merely referred to as the time information), to the accumulation part 105.

For example, as a typical detecting method of this scene change, a scene change detecting method described in Japanese Patent Application Laid-open No. 10-276435 has been known. According to this detecting method, on the basis of a degree of resemblance between histograms of a precedent scene and a following scene, it is determined whether or not the scene change occurs in both the scenes.

In the genre information obtaining part 104, the attached information (the program arrangement information) which has been outputted from the demultiplexer 101 is inputted. This genre information obtaining part 104 obtains the genre information such as a movie, a news program and a drama or the like in the voice image information on the basis of the attached information (the program arrangement information) which is inputted and outputs this genre information to the accumulation part 105.

Alternatively, this genre information may be obtained in addition to the input voice image information. For example, the genre information with respect to this input voice image information which is stored in an arbitrary place may be obtained through communication lines such as Internet or the like.

Additionally, in place of obtaining the genre information from the input voice image information, the genre information may be estimated on the basis of the voice image information in this input voice image information.

In this case, the estimating part is provided in the present embodiment and the genre may be estimated from the voice image information that is inputted by this estimating part. For example, the text information which is characterized by specifying each genre is prepared in advance, the voice is extracted from the input voice image information by the use of the voice recognition technology and further, a degree of accordance between this voice recognition result as the text information and the text information which is prepared in advance is calculated and the genre is estimated on the basis of this calculation result.

In the accumulation part 105, each piece of the input voice image information of plural times, the characteristic amount of the image information in each piece of voice image information which is extracted by the characteristic amount extracting part 102, the time information in which the scene change in each piece of the voice image information, which is detected by the scene change detecting part 103, is carried out, and the genre information of each piece of voice image information, which is obtained by the genre information obtaining part 104, are accumulated with being associated with each other for each piece of voice image information.

In order to detect the same shot as the preliminary announcement information to be described later, this accumulation part 105 outputs the object voice image information to be an object of the summary reproduction, the non-object voice image information and the characteristic amounts of the object and the non-object voice image information to the preliminary announcement portion estimating part 106 on the basis of the instructions of the controlling part 109.

Alternatively, this accumulation part 105 accumulates the temporal position information (hereinafter, referred to as the time information) of the same shot as the preliminary announcement information in the present object voice image information to be outputted from this preliminary announcement portion estimating part 106 and the time information of the same shot as this preliminary announcement information is accumulated with being associated with the object voice image information.

Further, in order to decide the summary segment to be extracted and perform the summary reproduction, this accumulation part 105 outputs the voice image information to the reproducing part 108 and outputs the scene change information and the time information of the preliminary announcement partial image information to the controlling part 109 on the basis of the instruction of the controlling part 109.

In the preliminary announcement portion estimating part 106, the object voice image information and the characteristic amount of the voice image information at a portion having the preliminary announcement information in the non-object voice image information are inputted. Normally, in most cases, the preliminary announcement information is included in a section of ten minutes before a finish time of the non-object voice image information, so that, according to the present embodiment, a section of ten minutes before a finish time of the non-object voice image information is inputted as the preliminary announcement information in the preliminary announcement portion estimating part 106.

This preliminary announcement portion estimating part 106 compares the characteristic amount of the input object voice image information with that of the non-object voice image information, and detects the same shot from the object voice image information. Then, the preliminary announce- ment portion estimating part 106 outputs the time information in the object voice image information of this detected shot to the accumulation part 105. Alternatively, the details of a detection principle and a detection operation of this same shot will be described later.

In the reproducing part 108, the voice image information which has been outputted from the accumulation part 105 is inputted. This reproducing part 108 separates the input and multiplexed voice image information into the image information and the voice information to decode them and then, it carries out the summary reproduction on the basis of the instruction of the controlling part 109. Alternatively, this reproducing part 108 outputs these reproduced voice signal and reproduced image signal to the displaying part 110.

The controlling part 109 controls the accumulation in the accumulation part 105 on the basis of the instruction which is inputted by the operating part 107, and it decides a summary segment on the basis of the image information of the preliminary announcement information in the object voice image information which is detected by the preliminary announcement portion estimating part 106 and the scene change information (hereinafter, this processing is referred to as the summary segment decision processing), and it controls the reproduction of the reproducing part 108 on the basis of this decided summary segment.

Alternatively, in this summary segment decision processing, a scene including the time information in the object voice image information of this detected same shot is extracted on the basis of the scene change information, and the controlling part 109 carries out the summary reproduction in order of time as this extracted scene is defined as a summary segment.

Specifically, as described later, the scene change information of the object voice image information is read and a segment from a most adjacent scene change point before the start time of the same shot to a most adjacent scene change point after a finish time of this same shot is decided as a summary segment (refer to FIG. 4).

In the displaying part 110, a voice signal and an image signal which have been outputted from the reproducing part 108 are inputted. This displaying part 110 displays this input image signal in a monitor screen and it makes the voice signal stronger by a speaker or the like.

The recording reservation controlling part 111 controls the accumulation part 105 so that the accumulation part 105 accumulates a TV broadcasting program (the voice image information) or all voice image information to be provided through TV broadcasting on the basis of the instruction in the operating part 107 which is inputted through the controlling part 109 and further, the recording reservation controlling part 111 stores the object voice image information and the non-object voice image information with being associated with each other upon accumulating the voice image information in the accumulation part 105.

Particularly, the recording reservation controlling part 111 retrieves and controls the non-object voice image information in the object voice image information upon recording the continues voice image information to be provided on a regular basis so that the preliminary announcement portion estimating part 106 estimates the preliminary announcement portion.

In the next place, with reference to FIG. 3 and FIG. 4, a detecting principle of the same shot in the object voice image information in the preliminary announcement portion estimating part 106 will be explained below.

Figure 3:
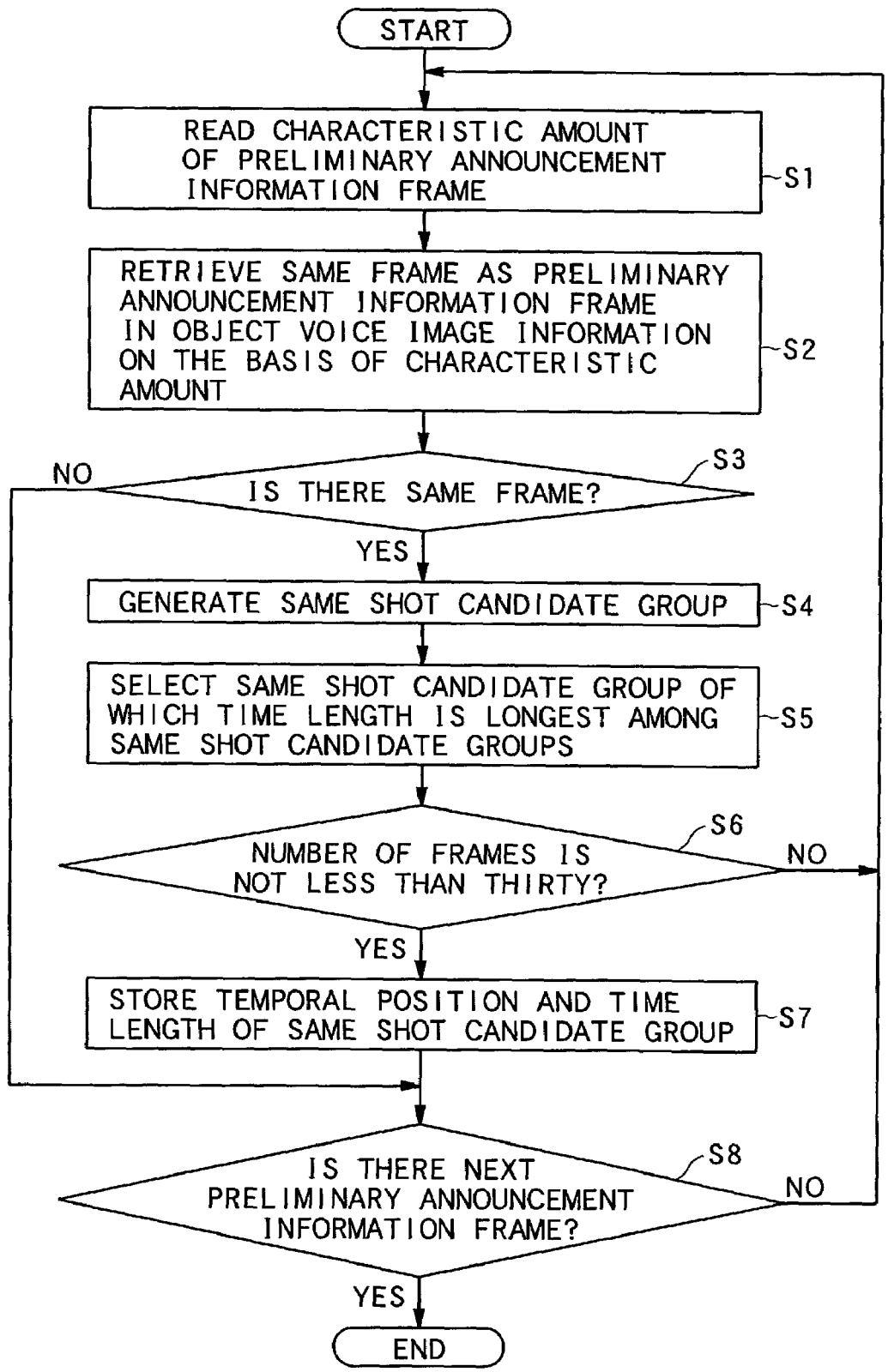
FIG. 3 is a flow chart for showing the detection operation for detecting the same shot as the preliminary announcement information according to the present embodiment.
Figure 4:
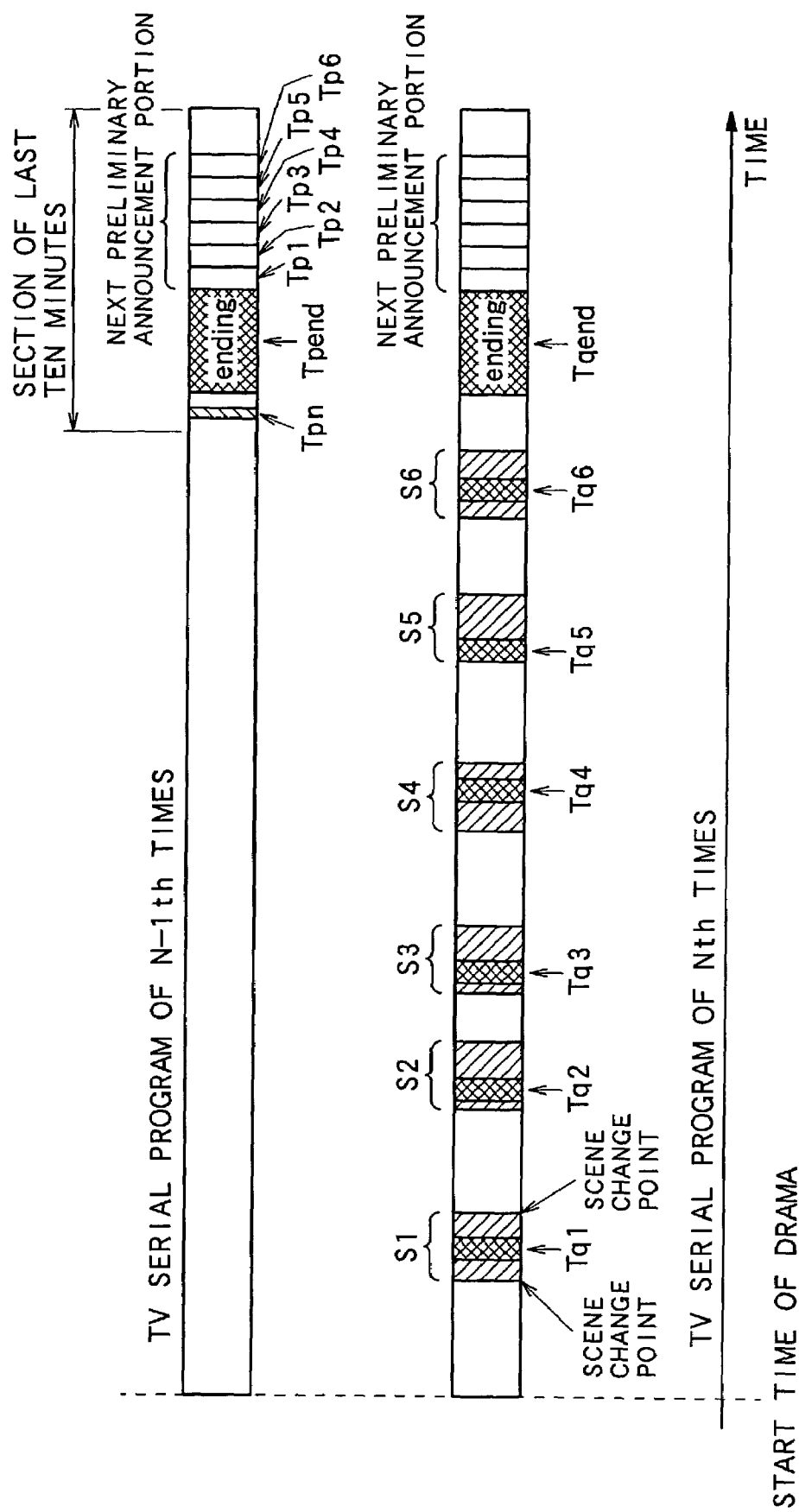
FIG. 4 is a view for explaining a detection principle of the same shot (an example of a detection result with respect to the same shot) according to the present embodiment.

FIG. 3 is a flow chart for showing a detection principle of the same shot and FIG. 4 shows an example of a detection result of the same shot. Additionally, in this case, a series TV serial program having continuity such as a drama or the like will be explained as an object of the summary reproduction.

Normally, in the object voice image information as an object of the summary reproduction in Nth times, the preliminary announcement information as the image information of the preliminary announcement portion exists in a range of the last ten minutes in the non-object voice image information in N-1th times. This preliminary announcement information is characterized in that a time length owned by each shot in this preliminary announcement information is short (about five seconds), and that each shot in the object voice image information corresponding to each shot in this preliminary announcement information exists at a temporally remote position.

In the present embodiment, according to a detecting method of the shot in the object voice image information which is the same as each shot in the preliminary announcement information, the image characteristic amount of each shot in the preliminary announcement portion for the last ten minutes in the non-object voice image information is compared with the image characteristic amount of all shots in the object voice image information, so that each shot in the object voice image information which is identical with the characteristic amount of the preliminary announcement portion in the non-object voice image information is detected.

Specifically, the same frame in the object voice image information is retrieved for each frame of each shot in the preliminary announcement information. For example, in the case where a length of the continuously identical frames is not less than the length of the predetermined number of frames, the corresponding shot in the object voice image information is detected as the same shot.

In the next place, the detection principle will be shown with reference to a flow chart in FIG. 3.

At first, a characteristic amount of the image information of a first frame at a first shot located in a section for ten minutes before the last time in the non-object voice image information is read (step S1) and a frame of the object voice image information having the same characteristic amount in this first non-object voice image information is detected (step S2).

Alternatively, each frame of each shot located in a section for ten minutes before the last time in this non-object voice image information is referred to as a preliminary announcement information frame.

In the next place, it is determined whether or not the same frame as a frame of the first preliminary announcement information exists in the non-object voice image information (step S3). In the case that there is no same frame, the processing is shifted to step S8. Alternatively, in the case where there is the same frame as a frame of the preliminary announcement information, the operation to be described below will be carried out.

At first, comparing a frame which is determined to be the same frame (hereinafter, referred to as the same shot candidate) with a temporally next same frame candidate, it is determined whether or not the characteristic amounts thereof are identical with each other to generate a shot candidate group of which characteristic amounts are the same (step S4). This processing will be carried out with respect to all of the same shot candidates.

For example, assuming that F1, F2, F3, F4, . . . , F10 are the same frames (a same shot candidate) as the preliminary announcement information frame in the step S3, the characteristic amount of F1 is compared with that of F2, the characteristic amount of F2 is compared with that of F3, . . . and each characteristic amount of the same shot candidates is compared with that of next same shot candidate. Then, if there is a frame of which characteristic amount is identical with that of other frame, further, it is determined whether or not the characteristic amount of this frame is identical with that of the next temporally same frame candidate. This determination is performed with respect to all of the same shot candidates, so that a group having the same characteristic amount, namely, the same shot candidate group is generated. For example, the same shot candidate group is generated, for example, in such a manner that F1 to F3 constitutes a same shot candidate group and F4 to F10 constitutes another same shot candidate group.

In the next place, a same shot group of which time length is the longest is selected (step S5). In the above case, the same shot candidate group of F4 to F10 is selected.

Then, it is determined whether or not the number of frames (the number of shots) of this same shot group is not less than thirty (step S6). If it is not more than thirty, the processing proceeds to step S8. Alternatively, if the number of frames (the number of shots) of this same shot group is not less than thirty, a temporal position and a time length of the shot is stored (step S7).

In the next place, it is determined whether or not there is a frame next to the preliminary announcement information frame or there is a shot next to the preliminary announcement information frame (step S8). In the case that there is neither next frame nor next shot, the processing will be terminated. Further, in the case where there is a next frame or a next shot, the processing will proceed to the step S2, the characteristic amount of a next frame of the preliminary announcement or an initial frame of the next shot is read (step S1), and the same frame is retrieved from the object voice image information (step S2).

When the same shot as the preliminary announcement information frame is retrieved in this way, the time information in the object voice image information of the above detected same shot has been outputted to the accumulation part 105.

FIG. 4 shows an example of the detection result with respect to the same shot. In this case, a reference symbol of Tp shows each shot of the preliminary announcement information and a reference symbol of Tq shows the same shot as the Tp. Alternatively, reference symbols of Tpend and Tqend show an ending image in each piece of voice image information and a reference symbol of S shows a summary segment having the shot Tq.

As described above, a detection principle of the same shot between the object voice image information and the non-object voice image information is fundamentally realized by retrieving the same frame between the object voice image information and the non-object voice image information. However, it is not possible to detect nothing but the preliminary announcement information appropriately only depending on the above-described detection principle.

In other words, in order to detect a temporal position of the non-object voice image information of the preliminary announcement information such as the start time and the finish time or the like, the same shot is detected by estimating a temporal range in which there is the preliminary announcement information in advance. Therefore, there is a possibility that the identical shots may be detected accidentally and the same image information such as the ending or the like may be found (Tpend and Tqend shown in FIG. 3).

According to the present embodiment, in order to exclude such shots which are accidentally identical and the same image information to be estimated in advance, the following conditions are added so that it is deemed that the same shots relevant to these conditions are not the preliminary announcement information.

According to one of these conditions, the time length of the shot determined to be the same is not more than one second. For example, due to the high speed processing, the characteristic amount of the image information is obtained relatively easily, so that it may be accidentally determined that Tpn shown in FIG. 4 is identical with any shot of the TV serial program of Nth times. This condition serves to exclude this. Under this condition, it is determined that the shot not more than one second is not the preliminary announcement information, so that it is possible to exclude the shot identical with the shot which is not the preliminary announcement information shot.

According to another one of these conditions, the time length of the shot determined to be the same is not less than five second. Generally, the preliminary announcement information provides a plurality of shots in a short time, so that a time length of each shot is short. Accordingly, when the identical shot continues for not less than five seconds, it is not considered that arbitrary shot in the preliminary announcement information is identical. This condition serves to exclude this. Under this condition, it is possible to exclude the common image information in the voice image information each time such as an ending showing the end of the voice image information each time and CM (Commercials) or the like and a portion which is identical in the portion other than the preliminary announcement information.

According to still another one of these conditions, the temporal positions of the shot which is determined as the same shot are not identical in each of the object voice image information and the non-object voice image information. This condition serves to exclude the common image information in the voice image information each time such as an ending showing the end of the voice image information each time and CM (Commercials) or the like. Alternatively, under the present condition, if the temporal positions are identical within a predetermined temporal range, it is deemed that the temporal positions thereof are identical. According to the present embodiment, this temporal range is set in thirty seconds.

Furthermore, according to other condition, the temporal position in each detected shot is not continuous. The voice image information of the preliminary announcement information comprises a set of the voice image information in which characteristic shots are continuously connected in the object voice image information. Therefore, each shot of the preliminary announcement information is located at temporally remote position, so that, when the portions which are detected as the same shots are temporally continued, either shot or both the shots may be different from the shot of the preliminary announcement information. According to the present embodiment, when these temporal positions are continued, both the shots are excluded from the same shot as the preliminary announcement information portion.

The same shot is detected on the basis of these respective conditions, so that it is possible to detect the same shot as the preliminary announcement information without setting the temporal position of the preliminary announcement information in advance.

In the next place, with reference to FIG. 5, a detection operation (a detection processing process) of the same shot of the object voice image information in the preliminary announcement portion estimating part 106 will be explained below.

Figure 5:
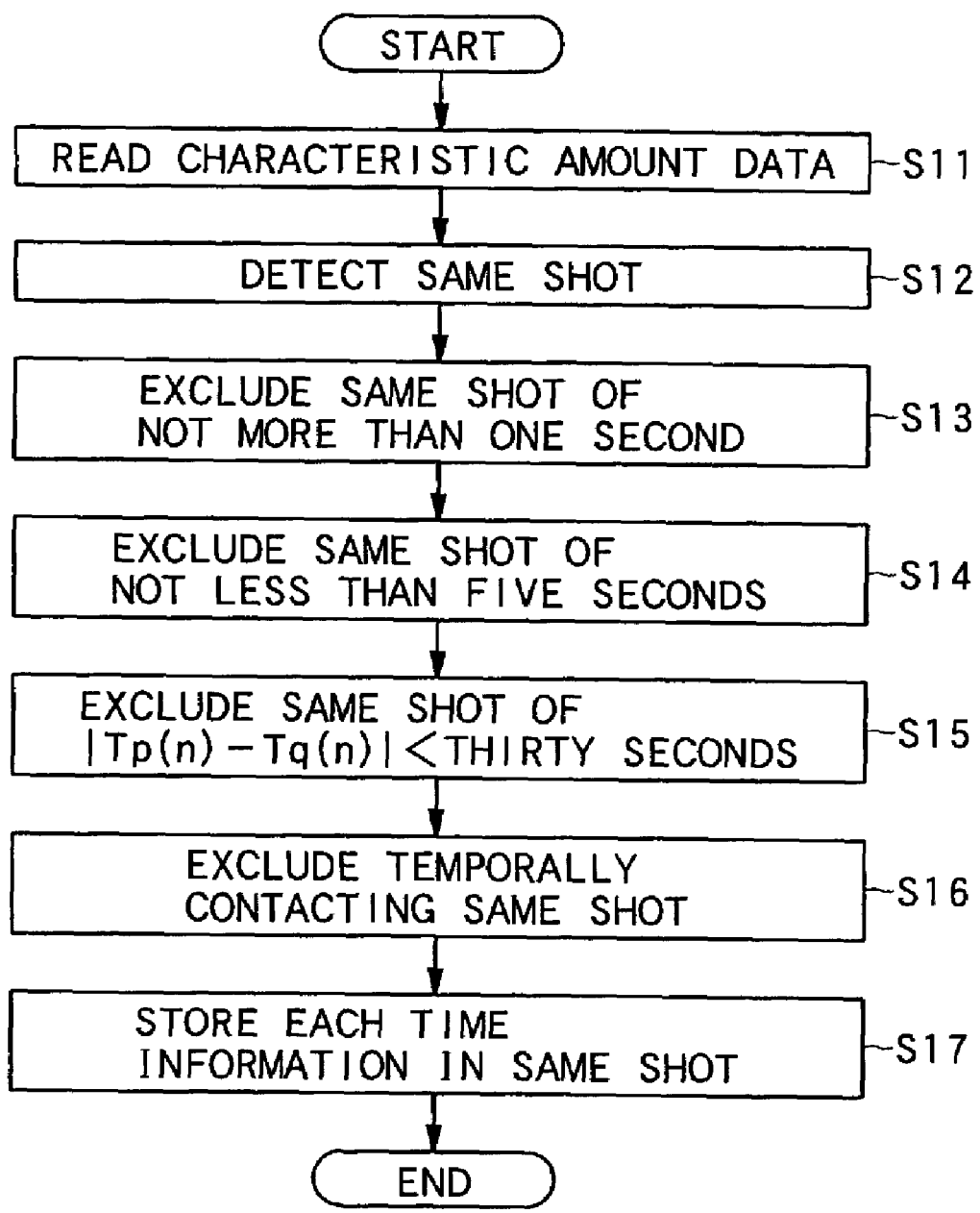
FIG. 5 is a flow chart for showing the decision processing of a summary segment in the summary reproduction according to the present embodiment.

FIG. 5 is a flow chart for showing the decision processing operation of a summary segment in the summary reproduction according to the present embodiment. According to the present operation, it is assumed that the voice image information which have been provided plural times, namely, the characteristic amounts of the image information of the object voice image information and the non-object voice image information have been already accumulated in the accumulation part 105. The present operation is carried out in advance before the user instructs the summary reproduction or it is carried out when the user instructs the summary reproduction.

At first, the characteristic amount data of the object voice image information and the non-object voice image information is read out (step S11) and the object voice image information is compared with the a section of the last ten minutes of the non-object voice image information for each frame, so that the same shot is detected from the object voice image information (step S12).

In the next place, it is determined whether or not a time length of the detected same shot is not more than a predetermined time length (for example, one second) and then, the same shot relevant to this condition is excluded from the detection result (step S13).

In the next place, it is determined whether or not a time length of the detected same shot is not less than a predetermined time length (for example, five seconds) and then, the same shot relevant to this condition is excluded from the detection result (step S14).

Then, it is determined whether or not a temporal position (Tp(n)) in the non-object voice image information and a temporal position (Tq(n)) in the object voice image information in the same shot are found within a predetermined time (for example, thirty seconds). If they are found within a predetermined time, the same shot is excluded from the detection result (step S15).

In the next place, it is determined whether or not each same shot is adjacent to other same shot at a temporal position in the object voice image information. Then, in the case where there is a same shot which is adjacent to other same shot, the former same shot is excluded from the detection result (step S16).

In the last place, the time information in the object voice image information in the same shot, for example, the temporal position information with respect to a start time and a finish time of the same shot is stored in the accumulation part 105 with being associated with this object voice image information (step S17).

According to the present embodiment, the same shot as the preliminary announcement information is detected from the object voice image information which is an object of the summary reproduction in this way.

In the next place, with respect to FIG. 6, the summary reproduction operation will be explained below.

Figure 6:
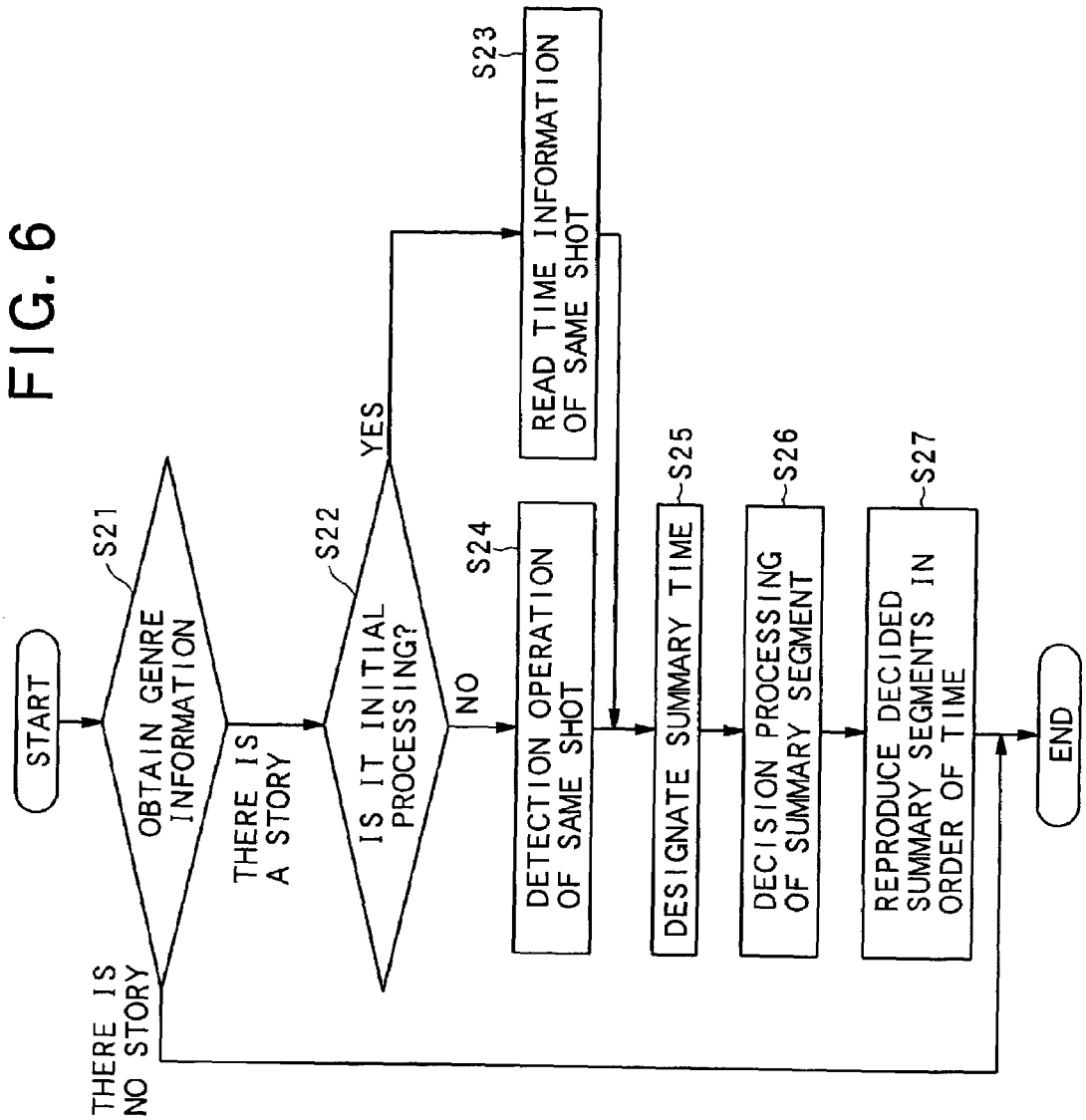
FIG. 6 is a flow chart for showing the summary reproduction operation according to the present embodiment.

FIG. 6 is a flow chart for showing the summary reproduction operation according to the present embodiment. According to the present operation, it is assumed that the object voice image information necessary for the present summary reproduction and the scene change information of this object voice image information and each piece of voice image information have been already accumulated in the accumulation part 105. The present operation is carried out when the user instructs the summary reproduction.

At first, when the user inputs the instruction of the summary reproduction through the operating part 107, the controlling part 109 obtains the genre information of the voice image information that is instructed by the user (step S21). Alternatively, in the case where the genre information is not the voice image information having continuity, the present operation will be terminated and the summary reproduction operation other than the present operation will be carried out. Further, in the case where the genre information is the voice image information having continuity, the following operations will be carried out.

At first, it is determined whether or not the detection processing of the same shot in the instructed voice image information is carried out for the first time (step S22). If it is determined that the same shot was detected before, the data thereof is read from the accumulation part 105 (step S23).

Alternatively, when it is determined that the detection processing of the same shot in the instructed voice image information is carried out for the first time, with respect to the same shot of the instructed object voice image information, the above-described detection operation, which described in FIG. 5, in the preliminary announcement portion estimating part 106 will be carried out by the use of the former voice image information, namely, the non-object voice image information (detection processing process (step S24)).

After that, if the summary time which is instructed by the user is read, or if the summary time which is predetermined is read (step S25), as described above, the controlling part 109 decides a summary segment to be extracted on the basis of the time information of the same shot which is detected by the preliminary announcement portion estimating part 106 or the same shot which is read from the accumulation part 105 (decision processing process (step S26)).

Specifically, as described above, the scene change information of the object voice image information is read and a segment from a most adjacent scene change point before the start time of the same shot to a most adjacent scene change point after a finish time of this same shot is decided as a summary segment (refer to FIG. 4).

At last, the controlling part 109 adjusts a time so that this summary segment accords with a summary time. For example, the controlling part 109 adjusts a time length of this each summary segment so that, when the summary time is equally divided by the number of the summary segments, a time length of each summary segment accords with this divided time. After that, the controlling part 109 reproduces the summary segments in temporal orders (generation processing process (step S27)).

If the summary segment is decided upon the summary reproduction and the summary segment to be extracted is decided in this way, the controlling part 109 controls the reproducing part 108 so as to start the summary reproduction and simultaneously, the controlling part 109 controls the reproducing part 108 on the basis of this decided summary segment so as to carry out the summary reproduction.

Alternatively, according to the present embodiment, in the case where the voice image information is not provided plural times, in the detection operation of the same shot (step S23), the summary reproduction may be carried out by setting a temporal range of the preliminary announcement information to be included in the non-object voice image information and inputting the preliminary announcement information which has been obtained in advance.

In other words, according to the present embodiment, the non-object voice image information having the preliminary announcement information is compared with the object voice image information that is an object of the summary reproduction, the same shot as the preliminary announcement information is detected from the object voice image information without setting the preliminary announcement information in advance and simultaneously, this preliminary announcement information is also detected. However, by inputting the preliminary announcement information in advance or setting the temporal position of the preliminary announcement information and comparing the object voice image information with this set time range of the preliminary announcement information or the input preliminary announcement information, the same shot may be detected.

Alternatively, according to the present embodiment, if the object voice image information is the voice image information having continuity such as a drama or the like, the summary reproduction is carried out when the genre information is obtained. However, even in the case where the genre information is a news program, the summary reproduction may be carried out by inputting the preliminary announcement information or setting a temporal range of the preliminary announcement information as described above.

As described above, according to the present embodiment, it is possible to detect the same partial information which is the same as a characteristic portion composing the preliminary announcement information from the input image information on the basis of the preliminary announcement information in the image information which is an object of the summary reproduction. As a result, a producer of the image information, namely, a human being is capable of generating the summary information on the basis of the preliminary announcement information which is edited depending on the appreciation of a content of the image information, so that it is possible to provide the summary information which is more suitable for the user to grasp a content of the image information appropriately in a short period of time.

Additionally, by comparing the image information to be summarized (for example, any image information in the image information of plural times) with other image information (for example, the image information of last time among the image information to be summarized), it is possible to detect the same partial information in each piece of image information. Therefore, without instructing the preliminary announcement information such as a temporal position or the like particularly, if the image information having this preliminary announcement information is obtained, it is possible to generate the summary information on the basis of this preliminary announcement information. As a result, it is possible to provide the summary information that is more suitable for the user to grasp a content of the image information appropriately without the need of burdensome operations.

Alternatively, according to the present embodiment, in the voice image information having the image information of the preliminary announcement portion, namely, in a section of the last ten minutes in the non-object voice image information of the (N-1)th time, the same shot is retrieved. However, the same shot may be retrieved without setting a detection section in the non-object voice image information in advance. This serves to improve the calculation efficiency of the same shot. Accordingly, it is a matter of course that the same shot may be retrieved by comparing all shots in the non-object voice image information with all shots of the object voice image information.

Further, according to the present embodiment, the scene change is detected on the basis of the input image information and the summary segment candidate is set on the basis of the time information of the same shot of the preliminary announcement information and the scene change information. However, by detecting a characteristic portion on the basis of the voice levels of the voice information which is attached to the preliminary announcement information and the voice image information, a summary segment candidate may be set on the basis of this detected characteristic portion including the time information of the same shot of the preliminary announcement information.

Alternatively, according to the present embodiment, the extracted summary segment is decided as one of summary segments to be extracted, namely, a candidate of the summary segment to be used for the summary reproduction (hereinafter, referred to as a summary segment candidate) and other elements such as a summary time and a level of importance of this summary segment candidate are determined, so that a summary segment to be used for the summary reproduction may be decided from this summary segment candidate.

In this case, for example, according to another method to obtain a preliminary announcement information candidate, in the case where the input voice image information is continued for a predetermined time at a portion which is larger (or smaller) than a reference voice level in the summary reproducing apparatus as shown in FIG. 7, an address of a portion which is larger (or smaller) than this reference voice level is recorded. Then, on the basis of this address, a portion of which level is larger (or smaller) than this reference voice level may be obtained as a summary segment candidate.

Further, upon setting a level of importance, in the case where a summary segment candidate is detected by such a voice level, a method may be considered, by which the genre information of this voice image information is obtained and a level of importance of each voice section is decided on the basis of the genre information of this voice information.

Alternatively, according to the present embodiment, as described above, the summary reproducing apparatus 100 contains the genre information obtaining part 104, the accumulation part 105, the preliminary announcement portion estimating part 106, the reproducing part 108, and the controlling part 109 or the like. However, the respective operations of each part, namely, the above-described genre information obtaining part 104, the accumulation part 105, the preliminary announcement portion estimating part 106, the reproducing part 108 and the controlling part 109 or the like may be carried out by providing a computer and a recording medium such as a hard disk or the like to the controlling part 109, storing a program to perform the above-described processing corresponding to each part of the summary reproducing apparatus 100 in this recording medium and reading this program by the computer.

In this case, when the above-described detection operation and the summary reproduction operation of the same shot of the object voice image information, by operating the computer with the stored program, the detection operation and the summary reproduction operation of the same shot in this object voice image information may be carried out. Alternatively, in this case, the controlling part 109 constitutes the identification information obtaining device, the obtaining device, the detecting device, the generating device and the decision device according to the present invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application Nos. 2001-278504 and 2001-304359 filed on Sep. 13, 2001 and Sep. 28, 2001 including the specification, claims, drawings and summary is incorporated herein by reference in its entirety.

What is claimed is:

1. An image information summary apparatus for extracting one piece or plural pieces of partial image information which is a portion of the input image information from the input image information and generating the summary information in which a time length of the image information is contracted on the basis of the extracted partial image information, comprising:

an obtaining device which obtains the preliminary announcement information which has been generated in advance and in which characteristic portions in the input image information are continuously connected;

a detecting device which detects the same partial information which is the same image information as the characteristic portion which constitutes the preliminary announcement information from the input image information;

a decision device which decides the partial image information to be extracted on the basis of the detected same partial information; and a generating device which generates the summary information by extracting the decided partial image information from the input image information.

2. The image information summary apparatus according to claim 1, wherein, when a temporal position in the input image information of the same partial information which is detected by the detecting device and a temporal position in the input image information of other pieces of the same partial information are temporally continued, the detecting device excludes the temporally continued same partial information from the same partial information, which is detected by the detecting device; and the decision device decides the partial image information to be extracted on the basis of a detection result, from which the temporally contacting same partial information is excluded.

3. The image information summary apparatus according to claim 1, comprising:

an identification information obtaining device which obtains the identification information of the image information, wherein, in the case where it is identified by the identification information obtaining device that the identification information of the image information is the image information having a story, the decision device decides the partial image information to be extracted on the basis of the same partial information which is detected by the detecting device.

4. An image information summary apparatus for extracting one piece or plural pieces of partial image information which is a portion of the input image information from the input image information and generating the summary information in which a time length of the image information is contracted on the basis of the extracted partial image information, comprising:

an obtaining device which obtains other image information at least having the preliminary announcement information which has been generated in advance and in which characteristic portions in the input image information are continuously connected;

a detecting device which detects the same partial information which is partially the same image information as the characteristic portion which constitutes the preliminary announcement information from the input image information by comparing the input image information with the other image information;

a decision device which decides the partial image information to be extracted on the basis of the detected same partial information; and a generating device which generates the summary information as extracting the decided partial image information from the input image information.

5. The image information summary apparatus according to claim 4, wherein the detecting device detects the same partial information having a predetermined time length.

6. The image information summary apparatus according to claim 4, wherein, when a temporal position in the input image information of the same partial information which is detected by the detecting device is identical with a temporal position in other image information having the preliminary announcement information within a predetermined temporal range, the detecting device excludes the same partial information, of which temporal position is identical with that in other image information within the temporal range, from the same partial information, which is detected by the detecting device; and the decision device decides the partial image information to be extracted on the basis of a detection result, from which the same partial information, of which temporal position is identical with that in other image information within the predetermined temporal range, is excluded.

7. The image information summary apparatus according to claim 4, wherein, when a temporal position in the input image information of the same partial information which is detected by the detecting device and a temporal position in the input image information of other pieces of the same partial information are temporally continued, the detecting device excludes the temporally continued same partial information from the same partial information, which is detected by the detecting device; and the decision device decides the partial image information to be extracted on the basis of a detection result, from which the temporally contacting same partial information is excluded.

8. The image information summary apparatus according to claim 4, comprising:

an identification information obtaining device which obtains the identification information of the image information, wherein, in the case where it is identified by the identification information obtaining device that the identification information of the image information is the image information having a story, the decision device decides the partial image information to be extracted on the basis of the same partial information which is detected by the detecting device.

9. An image information summary method for extracting one piece or plural pieces of partial image information which is a portion of the input image information from the input image information and generating the summary information in which a time length of the image information is contracted on the basis of the extracted partial image information, comprising the processes of:

obtaining processing for obtaining the preliminary announcement information which has been generated in advance and in which characteristic portions in the input image information are continuously connected;

detecting processing for detecting the same partial information which is the same image information as the characteristic portion which constitutes the preliminary announcement information from the input image information;

decision processing for deciding the partial image information to be extracted on the basis of the detected same partial information; and generating processing for generating the summary information by extracting the decided partial image information from the input image information.

10. The image information summary method according to claim 9, wherein, when a temporal position in the input image information of the same partial information which is detected according to the detection processing process and a temporal position in the input image information of other pieces of the same partial information are temporally continued, according to the detection processing process, the temporally continued same partial information is excluded from the same partial information, which is detected by the detection processing process; and according to the decision processing process, the partial image information to be extracted is decided on the basis of a detection result, from which the temporally contacting same partial information is excluded.

11. The image information summary method according to claim 9, including identification information obtaining processing process for obtaining the identification information of the image information, wherein, in the case where it is identified that the identification information of the image information is the image information having a story according to the identification information obtaining processing process, according to the decision processing process, the partial image information to be extracted is decided on the basis of the same partial information which is detected by the detection processing process.

12. An image information summary method for extracting one piece or plural pieces of partial image information which is a portion of the input image information from the input image information and generating the summary information in which a time length of the image information is contracted on the basis of the extracted partial image information, comprising the processes of:

obtaining processing for obtaining other image information at least having the preliminary announcement information which has been generated in advance and in which characteristic portions in the input image information are continuously connected;

detecting processing for detecting the same partial information which is partially the same image information as the characteristic portion which constitutes the preliminary announcement information from the input image information by comparing the input image information with the other image information;

decision processing for deciding the partial image information to be extracted on the basis of the detected same partial information; and generating processing for generating the summary information as extracting the decided partial image information from the input image information.

13. The image information summary method according to claim 12, wherein, according to the detection processing process, the same partial information having a predetermined time length is detected.

14. The image information summary method according to claim 12, wherein, when a temporal position in the input image information of the same partial information which is detected according to the detection processing process is identical with a temporal position in other image information having the preliminary announcement information within a predetermined temporal range, according to the detection processing process, the same partial information, of which temporal position is identical with that in other image information within the temporal range, is excluded from the same partial information, which is detected according to the detection processing process; and according to the decision processing process, the partial image information to be extracted is decided on the basis of a detection result, from which the same partial information of which temporal position is identical with that in other image information within the predetermined temporal range is excluded.

15. The image information summary method according to claim 12, wherein, when a temporal position in the input image information of the same partial information which is detected according to the detection processing process and a temporal position in the input image information of other pieces of the same partial information are temporally continued, according to the detection processing process, the temporally continued same partial information is excluded from the same partial information, which is detected by the detection processing process; and according to the decision processing process, the partial image information to be extracted is decided on the basis of a detection result, from which the temporally contacting same partial information is excluded.

16. The image information summary method according to claim 12, including identification information obtaining processing process for obtaining the identification information of the image information, wherein, in the case where it is identified that the identification information of the image information is the image information having a story according to the identification information obtaining processing process, according to the decision processing process, the partial image information to be extracted is decided on the basis of the same partial information which is detected by the detection processing process.

17. An image information summary computer program stored in a computer's memory for, by a computer, extracting one piece or plural pieces of partial image information which is a portion of the input image information from the input image information and generating the summary information in which a time length of the image information is contracted on the basis of the extracted partial image information, said image information summary computer program, when executed causes the computer to function as:

an obtaining device which obtains the preliminary announcement information which has been generated in advance and in which characteristic portions in the input image information are continuously connected;

a detecting device which detects the same partial information which is the same image information as the characteristic portion which constitutes the preliminary announcement information from the input image information;

a decision device which decides the partial image information to be extracted on the basis of the detected same partial information; and a generating device which generates the summary information as extracting the decided partial image information from the input image information.

18. The image information summary computer program according to claim 17, wherein, when a temporal position in the input image information of the detected same partial and a temporal position in the input image information of other pieces of the same partial information are temporally continued, the image information summary program makes the computer function as:

a detecting device which excludes the temporally continued same partial information from the detected same partial information; and a decision device which decides the partial image information to be extracted on the basis of a detection result, from which the temporally contacting same partial information is excluded.

19. The image information summary computer program according to claim 17, causing the computer to function as:

an identification information obtaining device which obtains the identification information of the image information, wherein, in the case where it is identified that the identification information of the image information is the image information having a story, the image information summary program makes the computer function as a decision device which decides the partial image information to be extracted on the basis of the detected same partial information.

20. An image information summary computer program stored in a compute's memory for, by a computer, extracting one piece or plural pieces of partial image information which is a portion of the input image information from the input image information and generating the summary information in which a time length of the image information is contracted on the basis of the extracted partial image information, said image information summary computer program, when executed causes the computer to function as:

an obtaining device which obtains other image information at least having the preliminary announcement information which has been generated in advance and in which characteristic portions in the input image information are continuously connected;

a detecting device which detects the same partial information which is partially the same image information as the characteristic portion which constitutes the preliminary announcement information from the input image information as comparing the input image information with the other image information;

a decision device which decides the partial image information to be extracted on the basis of the detected same partial information; and a generating device which generates the summary information as extracting the decided partial image information from the input image information.

21. The image information summary computer program according to claim 20, causing the computer to function as a detecting device which detects the same partial information having a predetermined time length.

22. The image information summary computer program according to claim 20, wherein, when a temporal position in the input image information of the detected same partial information is identical with a temporal position in other image information having the preliminary announcement information within a predetermined temporal range, the image information summary program makes the computer function as:

a detecting device which excludes the same partial information, of which temporal position is identical with that in other image information within the temporal range, from the detected same partial information; and a decision device which decides the partial image information to be extracted on the basis of a detection result, from which the same partial information, of which temporal position is identical with that in other image information within the predetermined temporal range, is excluded.

23. The image information summary computer program according to claim 20, wherein, when a temporal position in the input image information of the detected same partial and a temporal position in the input image information of other pieces of the same partial information are temporally continued, the image information summary program makes the computer function as:

a detecting device which excludes the temporally continued same partial information from the detected same partial information; and a decision device which decides the partial image information to be extracted on the basis of a detection result, from which the temporally contacting same partial information is excluded.

24. The image information summary computer program according to claim 20, causing the computer to function as:

an identification information obtaining device which obtains the identification information of the image information, wherein, in the case where it is identified that the identification information of the image information is the image information having a story, the image information summary program makes the computer function as a decision device which decides the partial image information to be extracted on the basis of the detected same partial information.

* * * * *